United States Patent
Arrenberg et al.

(10) Patent No.: US 6,588,846 B2
(45) Date of Patent: Jul. 8, 2003

(54) ADJUSTING ARMATURE FOR THE BACK RESTS OF VEHICLE SEATS, IN PARTICULAR, MOTOR VEHICLE SEATS

(75) Inventors: Jürgen Arrenberg, Wuppertal (DE); Thomas Franzmann, Remscheid (DE); Cornel Labuwy, Burscheid (DE)

(73) Assignee: Keiper GmbH & Co., Kaiserslautern (DE)

( * ) Notice: Subject to any disclaimer, the term of this patent is extended or adjusted under 35 U.S.C. 154(b) by 0 days.

(21) Appl. No.: 10/142,376

(22) Filed: May 9, 2002

(65) Prior Publication Data

US 2002/0163239 A1 Nov. 7, 2002

Related U.S. Application Data

(63) Continuation of application No. PCT/EP00/10643, filed on Oct. 28, 2000.

(30) Foreign Application Priority Data

Nov. 9, 1999 (DE) .......................... 199 53 686

(51) Int. Cl.⁷ ................................ B60N 2/22
(52) U.S. Cl. ..................... 297/378.12; 297/354.1; 297/354.12
(58) Field of Search ............. 297/378.12, 378.14, 297/354.1, 354.12, 361.1

(56) References Cited

U.S. PATENT DOCUMENTS

| | | | |
|---|---|---|---|
| 3,788,685 A | | 1/1974 | Leichtl |
| 4,290,647 A | * | 9/1981 | Hensel et al. ......... 297/354.1 X |
| 4,358,155 A | | 11/1982 | Osterhold et al. |
| 4,521,055 A | | 6/1985 | Fudala |
| 4,629,252 A | * | 12/1986 | Myers et al. ....... 297/378.12 X |
| 5,240,309 A | * | 8/1993 | Kojer ..................... 297/378.12 |
| 5,340,195 A | * | 8/1994 | Notta ....................... 297/354.1 |
| 5,393,116 A | * | 2/1995 | Bolsworth et al. ...... 297/378.12 |
| 5,522,643 A | * | 6/1996 | Matsuura ................ 297/378.12 |
| 5,951,108 A | * | 9/1999 | Bauer et al. ........... 297/378.12 |
| 6,076,890 A | * | 6/2000 | Yoshida et al. ......... 297/378.12 |
| 6,139,104 A | * | 10/2000 | Brewer .............. 297/378.12 X |
| 6,209,955 B1 | * | 4/2001 | Seibold ................. 297/378.12 |
| 6,290,297 B1 | * | 9/2001 | Yu ........................ 297/378.12 |
| 6,328,381 B1 | * | 12/2001 | Smuk ................ 297/378.12 X |
| 6,447,066 B1 | * | 9/2002 | Chabanne et al. .. 297/378.12 X |
| 6,464,299 B1 | * | 10/2002 | Castagna ............... 297/378.12 |
| 6,513,875 B1 | * | 2/2003 | Gray et al. ............ 297/378.12 |
| 2002/0125757 A1 | * | 9/2002 | LeTournoux ........... 297/378.12 |
| 2002/0135216 A1 | * | 9/2002 | Hamelin et al. ....... 297/378.12 |

FOREIGN PATENT DOCUMENTS

| | | |
|---|---|---|
| EP | 0937603 | 8/1999 |
| EP | 1046537 | 10/2000 |

* cited by examiner

*Primary Examiner*—Rodney B. White
(74) *Attorney, Agent, or Firm*—Friedrich Kueffner

(57) ABSTRACT

An adjusting armature for a back rest of a vehicle seat, wherein the back rest is incline-adjustable about a first axis and can fold relative to the seat part about a second axis, has a rotary bracket connected to the back rest for pivoting with the back rest. A locking bolt receptacle is stationarily arranged on the seat part and has a planar support surface. A locking bolt is axially moveably arranged on the rotary bracket and spring-loaded in a locking direction for engaging releasably the locking bolt receptacle. A stop bolt is stationarily arranged on the seat part and cooperates with a stop receptacle on the rotary bracket. The locking bolt has a guide section and a locking section having a radially changing support curve. The guide section can rotate causing the radially changing support curve to be supported on the planar support surface for eliminating play.

10 Claims, 8 Drawing Sheets

ADJUSTING ARMATURE FOR THE BACK RESTS OF VEHICLE SEATS, IN PARTICULAR, MOTOR VEHICLE SEATS

This application is a continuation of International Application No. PCT/EP00/10643, filed on Oct. 28, 2000.

BACKGROUND OF THE INVENTION

1. Field of the Invention

The invention relates to an adjusting armature for the back rest of vehicle seats, in particular, of motor vehicles seats, wherein the back rest, which is optionally adjustable about a first axis of rotation in an inclined position and lockable in the adjusted inclined position by means of an adjusting device, can be folded forwardly and backwardly about a second external axis of rotation, positioned at a distance from the first axis of rotation, and is secured in its folded-back position on a locking bolt receptacle, stationarily arranged on the seat, by means of a locking bolt, engaging releasably the locking bolt receptacle and axially moveably arranged on a rotary bracket pivoting with the back rest and spring-loaded in the locking direction, and is supported by means of a stop receptacle on a stop bolt stationarily arranged on the seat.

2. Description of the Related Art

A similar device is disclosed in European patent application 0 937 603 A1. In this document an adjusting armature for the back rests of motor vehicle seats is described in which, on the one hand, the back rest is adjustable with regard to its incline about an axis and, on the other hand, is foldable about another axis. Locking is possible in the upright position of the back rest by means of a pin that is spring-loaded or receives a conical end which engages in a springy fashion a corresponding receptacle. A play-free arrangement is not ensured in all directions.

In an adjusting armature of the aforementioned kind of the present assignee, described in the German patent application 199 18 737.1-16, the armature component, which effects the adjustment and locking of the inclined back rest position and has a first axis of rotation, is arranged adjacent to a further armature component having a second axis of rotation. In order to transfer the back rest into a forwardly folded position which provides a table function, the second axis of rotation is arranged at a spacing above the first axis of rotation. For this purpose, generally on the frame of the seat part or on a locking plate fixedly connected thereto, an armature part of the armature component, which enables the inclination of the back rest in a position of use for the user of the seat, is secured detachably by means of a stop bolt and a locking bolt that is axially moveable in the locking direction and loaded by a force storing device.

Moreover, a bearing bracket of the second armature component is fixedly connected with the frame of the seat part or the locking plate and extends upwardly and past the first axis of rotation. This bearing bracket at its upper area is connected by means of an axle bolt with a rotary bracket to form a joint which provides the second axis of rotation of the adjusting armature. The rotary bracket is connected to the armature part that is detachably secured with the stop bolt and the locking bolt on the seat part and is pivotable therewith. As a result of the second axis of rotation being positioned higher, the back rest can be placed above the upholstery of the seat part in a table function position such that the backside of the back rest forms a horizontal plane without the upholstery of the back rest and of the seat part counteracting this. For securing this table function position, a pneumatic spring is arranged between the axis of rotation and the bearing bracket.

In this known solution, the axially movable locking bolt has a circular cross-section and engages in the locking situation a matching bore which, however must be slightly greater than the diameter of the locking bolt because of unavoidable tolerances. As a result of this unavoidable play, rattling cannot be prevented when the vehicle drives on bumpy roads.

SUMMARY OF THE INVENTION

It is an object of the invention to improve an adjusting armature of the aforementioned kind such that a securing or bracing is possible that eliminates play of the rotary bracket relative to the locking plate.

In accordance with the present invention, this is achieved in that the axially movable locking bolt has a guide section and a locking section and is subjected on its guide section, in addition to its axial guiding, also to a controlled rotational movement, based on which a radially changing support curve provided on the locking section can be supported on a planar support surface of the locking bolt receptacle so as to eliminate play.

By superimposing on the axially movable locking bolt a rotary movement such that its locking section with the adjustable radially changing support curve automatically readjust on a planar support surface of the locking bolt receptacle as a result of the spring loading action, a bracing that eliminates play is obtained in the locking situations so that the adjusting armature is free of rattling noises independent of its unavoidable tolerances.

For forming the radially changing support curve in connection with a support surface contacting it, the locking section of the annular pin has a periphery as follows: a first partial peripheral area extends about approximately 180° with a constant radius and is adjoined by a peripheral area of approximately 90° in which the support curve extends which, starting with the constant radius of the first partial peripheral area, has a continuously decreasing radial spacing from the center of the locking bolt, and then has a transition into at least one planar area which then adjoins finally the aforementioned first partial peripheral area with the constant radius. The locking bolt receptacle has, in addition to a circular circumferential area, a support surface which can be brought into contact with the support curve.

The support curve which has a continuously decreasing radial spacing from the center of the locking bolt can be designed as a logarithmic spiral with which the manufacturing tolerances and play can be compensated which do not reach the adjusting range resulting from the support curve and which are within the tolerances.

According to one embodiment of the invention, for axially guiding the locking bolt and providing a superimposed rotary movement derived from this axial movement, the guide section of the locking bolt is arranged axially slidably in a bushing secured on the rotary bracket and engages with at least one sliding block at least one sliding gate extending spirally in the bushing like a thread. In this connection, the bushing is advantageously surrounded by a trigger sleeve which has at least one guide groove ascending in the axial direction and whose slant or gradient is greater than the slant of the thread-like sliding gate of the bushing. The sliding gate is engaged by the sliding block which penetrates it and engages the guide groove of the trigger sleeve.

In order to prevent a malfunction which could possibly occur as a result of canting, according to a further embodiment of the invention the sliding gate as well as the guide groove are positioned on two locations of the bushing and the trigger sleeve which are diametrically opposite one another, wherein the sliding block is comprised of two guide pins which are arranged on the guide section of the locking bolt, penetrate through the sliding gate, and project into the guide groove. Moreover, an actuation device which is located remote from the locking mechanism for releasing the locking bolt can be realized in that the trigger sleeve has a connecting finger provided for attaching a pulling means thereto, such as a Bowden cable, for introducing a rotary movement into the trigger sleeve.

Since in the inactive position of the trigger sleeve the locking bolt projects from the bushing as a result of spring loading of the locking bolt in the locking direction, it is advantageous for the return movement of the back rest from its forwardly folded position when a guide rail is provided on the seat which projects into the pivot path of the locking bolt and has a slanted surface. This ensures that in the inactive state of the trigger sleeve the return pivot movement can be performed to such an extent until the locking bolt is able to drop into the locking bolt receptacle provided on the seat part.

Even though it is conceivable to arrange the guide rail and the locking bolt receptacle directly on the frame of the seat part, it may be advantageous for manufacturing-technological reasons when the bearing bracket together with the locking plate that is provided with the locking bolt receptacle as well as the guide rail is fixedly connected with the seat part.

In order for a safe correlation of the locking bolt to the locking bolt receptacle to be possible at the end of the return folding movement, on the one hand, and to provide a 3-point bracing of the rotary bracket relative to the seat part, on the other hand, the locking plate advantageously has underneath its locking bolt receptacle a stop for the rotary bracket and an armature part that is connected to the rotary bracket and comprises the first axis of rotation.

DESCRIPTION OF THE PREFERRED EMBODIMENTS

Figures 1A, 1B:
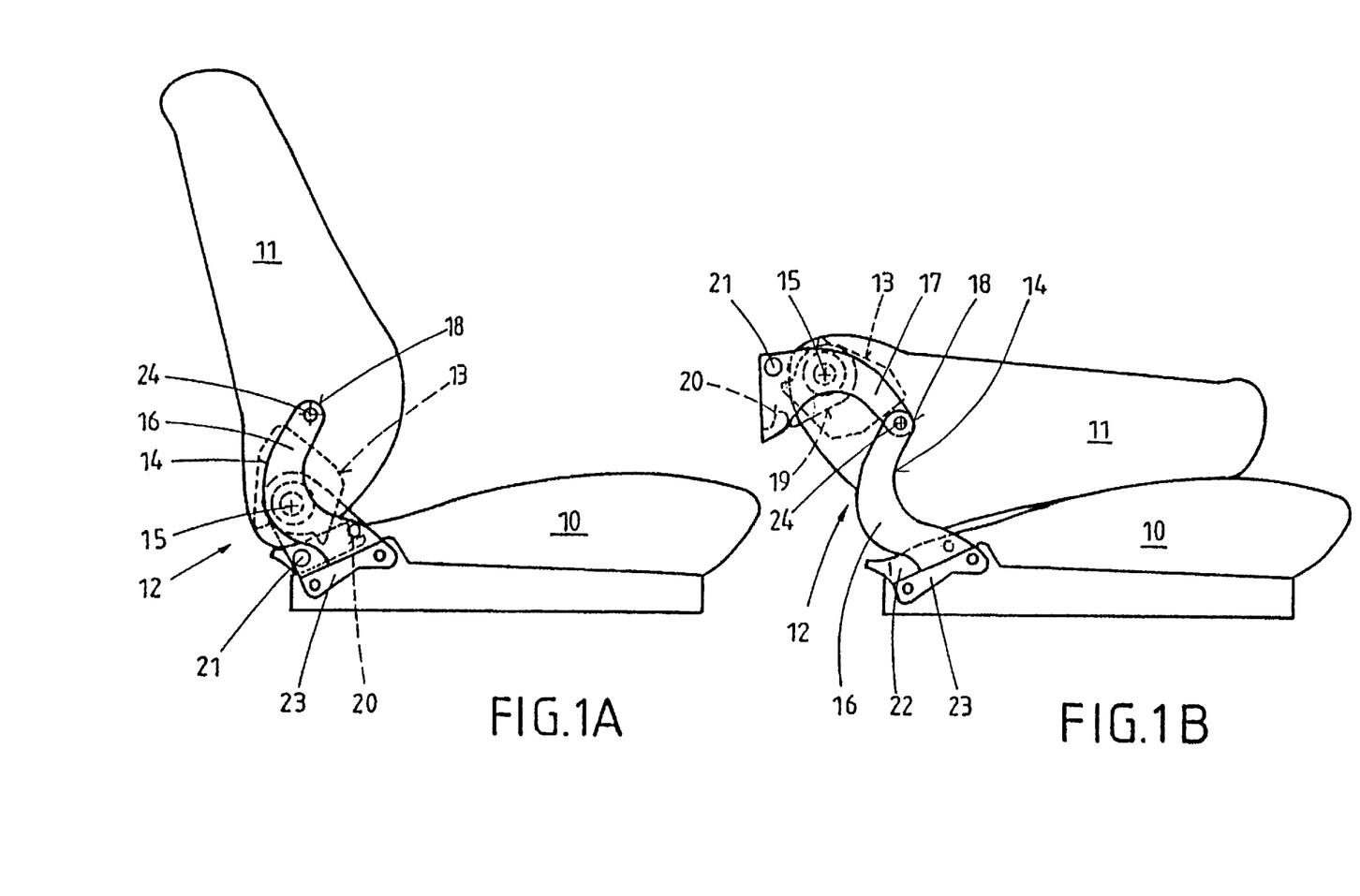
FIG. 1A shows a seat in a schematic side view, comprising an adjusting armature according to the invention arranged between the seat part and the back rest, wherein the back rest is in a position of use for the user of the seat.
FIG. 1B shows the seat illustrated in FIG. 1A in a schematic side view wherein the back rest has been pivoted forwardly into a table position.
Figure 2:
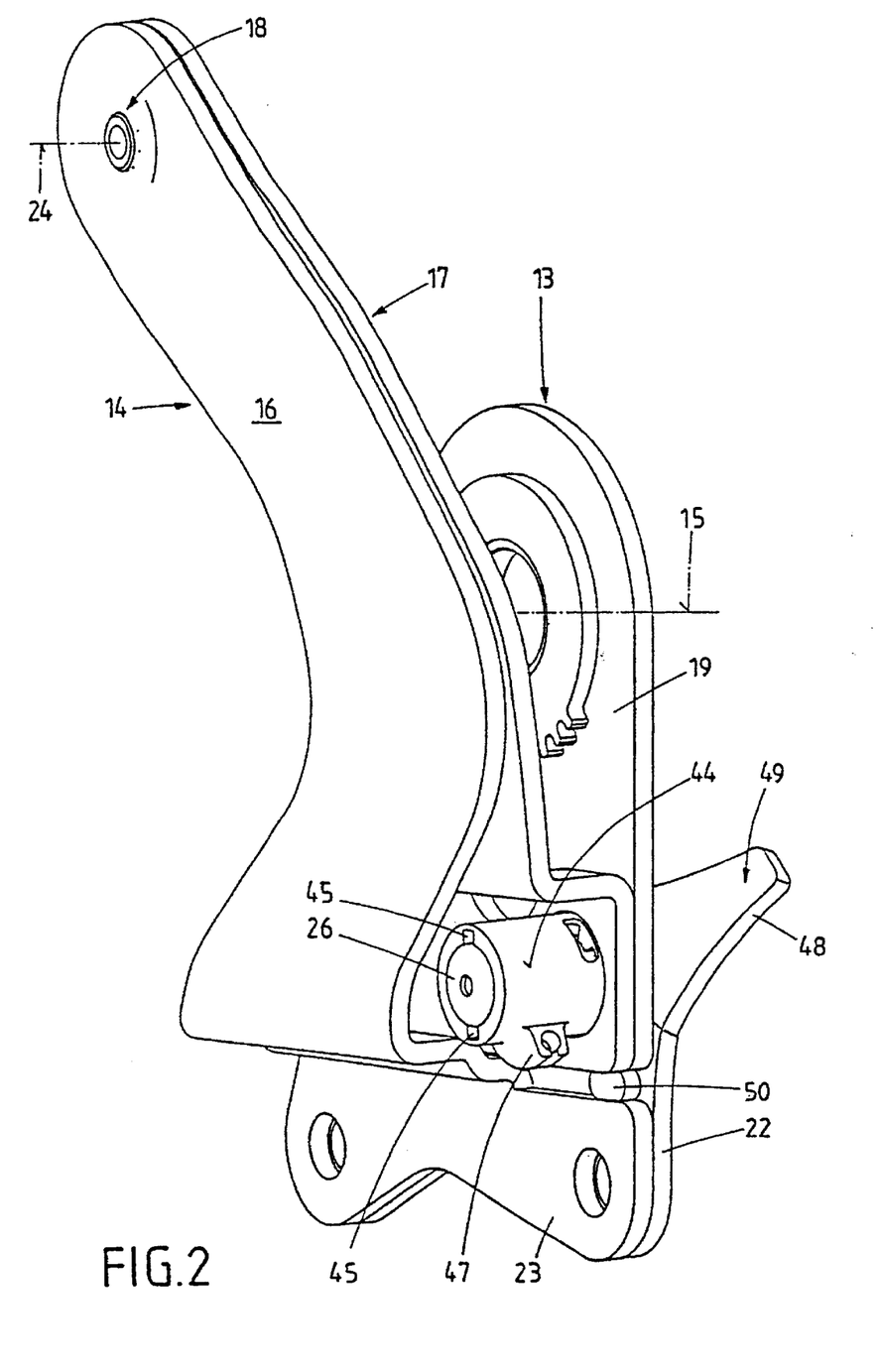
FIG. 2 shows the adjusting armature according to the invention in a perspective view at an angle from behind.
Figure 3:
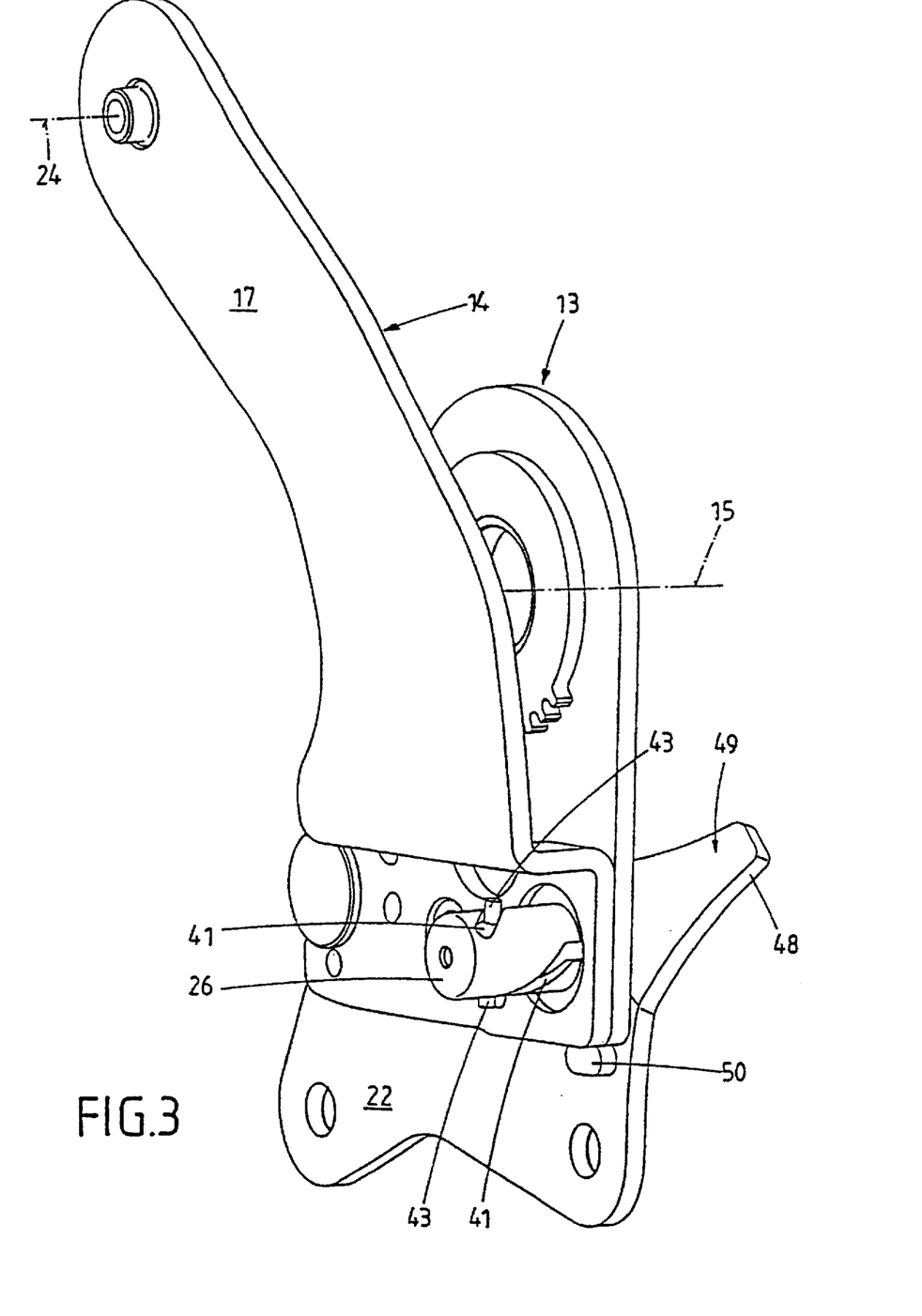
FIG. 3 shows the adjusting armature, also in a perspective view analog to FIG. 2, in which however the bearing bracket and the trigger sleeve have been removed.
Figure 4:
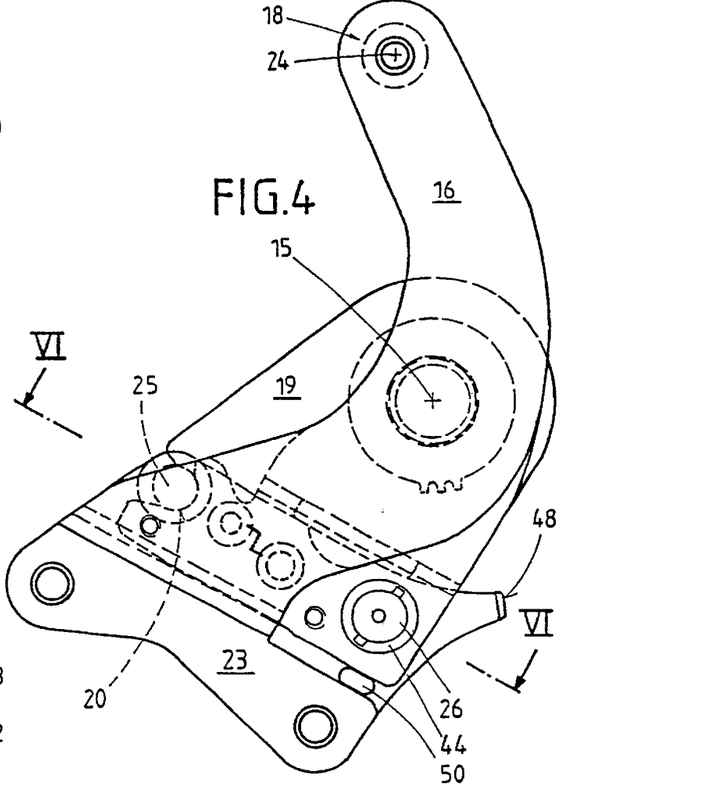
FIG. 4 shows the adjusting armature of FIG. 2 in a side view onto its exterior side.
Figure 5:
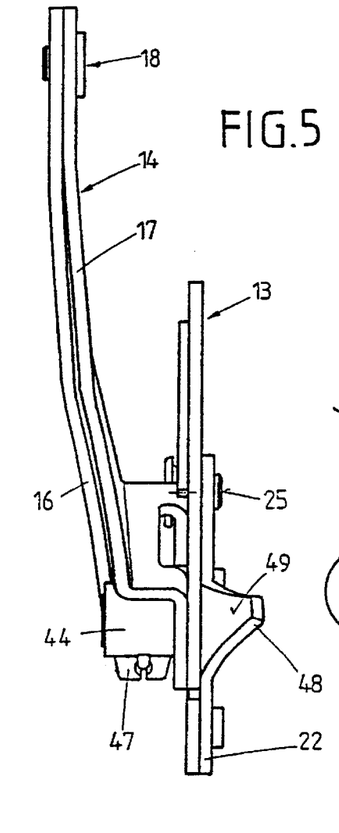
FIG. 5 shows the adjusting armature shown in FIG. 4 in an end view.
Figure 6:
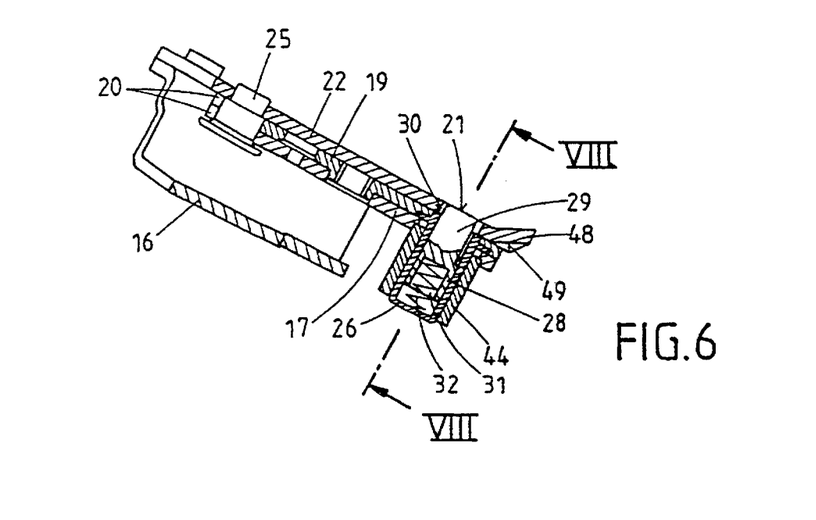
FIG. 6 shows the adjusting armature of FIG. 4 in a section according to section line VI—VI of FIG. 4.

FIG. 1A shows a vehicle seat with a seat part 10 and a back rest 11 wherein the back rest 11, fastened on the seat part 10 by means of the adjusting armature 12, is positioned at such an incline that a user can be seated in the seat. In this connection, on the seat frame of the seat part 10 the adjusting armature 12 comprised of two armature components 13 and 14 is fastened on each longitudinal side of the seat. With the adjusting armature component 13 the incline of the back rest 11 relative to the seat part can be adjusted and secured, for which purpose, for example, a so-called planetary armature can be used which comprises a simple planetary gear and whose armature part connected with the back rest 11 is pivoted about a first axis of rotation 15 in a self-locking way.

This first armature component 13 arranged on both longitudinal sides of the seat has arranged adjacent thereto a second armature component 14 which has a bearing bracket 16 secured on the frame of the seat part 10 and a rotary bracket 17 pivotably connected thereto by a joint 18. The lower part of the rotary bracket 17 is bent and fixedly connected to the armature part 19, correlated with the seat part 10, of the armature component 13 of the seat part 10.

In the position of use of the seat by a user, the armature part 19 and the rotary bracket 17 are connected by means of a stop receptacle 20 in connection with a stop bolt of a locking plate 22 and a locking bolt 21 releasably engaging it. The locking plate 22, in turn, is fixedly connected together with the recessed fastening area 23 of the bearing bracket 16 with, for example, the frame of the seat part 10. The joint 18 which connects the bearing bracket 16 and the rotary bracket 17 with one another has an external second axis of rotation 24 of the armature component 14 about which the rotary bracket 17, together with the first armature component 13 remaining in its adjusted position, is pivoted together with the back rest 11 such that it can be transferred into a table function position as illustrated in FIG. 1B.

In the adjusting armature illustrated in FIGS. 1 through 5, the second external rotary axis 24 in the position of use of the seat illustrated in FIG. 1A is located at a spacing above the first axis of rotation 15 of the armature component 13, wherein this spacing is selected such that, upon movement of the back rest 11 into the table position illustrated in FIG. 1B, the upholstery of the seat part 10 and the back rest 11 will not have a negative effect on the table function position.

For arresting the back rest in a position of use in which a user can sit in the seat, the rotary bracket 17 fixedly connected to the armature part 19 and the armature part 19 have a stop receptacle 20 on one side with which a stop bolt 25 secured on the locking plate 22 can be partially engaged. On the side opposite the stop receptacle, a bushing 26 is fixedly connected on the rotary bracket 17 and the armature part 19 connected thereto. The guide section 28 of the locking bolt 21 is axially moveably supported within the bushing 26. A locking section 29 of the locking bolt 21 adjoins the guide section 28 and can engage a locking bolt receptacle 30 of the locking plate 22. The guide section 28 of the locking bolt 21 has a hollow cylindrical recess 31 which is provided for receiving a pressure spring 32. This pressure spring 32 is supported with one end on the bottom of the bushing 26 and loads the locking bolt 21 in the locking direction.

Figure 10B:
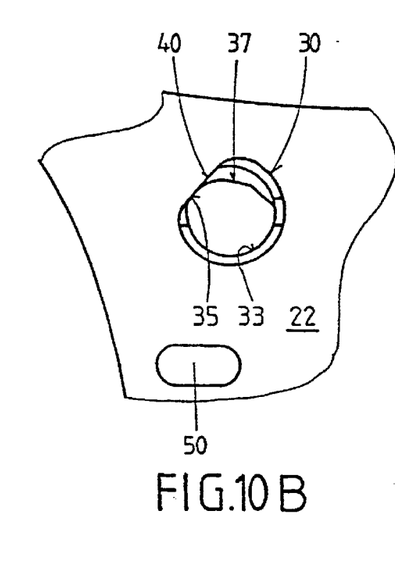
FIG. 10B shows the locking bolt illustrated in FIG. 10A in the locking bolt receptacle in a broken-away side view of the adjusting armature.
Figure 11A:
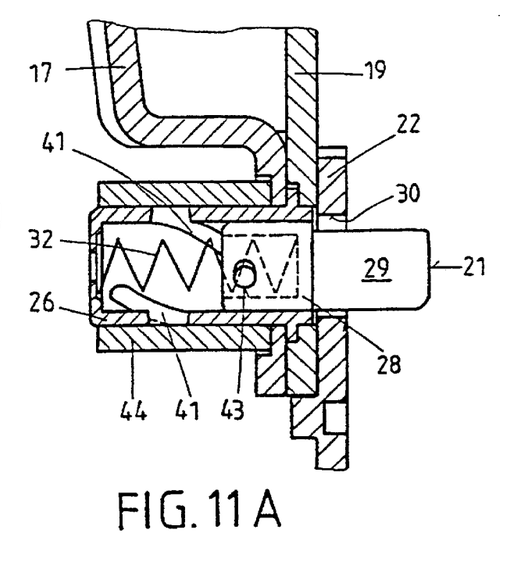
FIG. 11A shows the locking area illustrated in section in analogy to FIG. 10A, wherein the locking bolt is in a rotary position which compensates tolerances and is play-free.
Figure 11B:
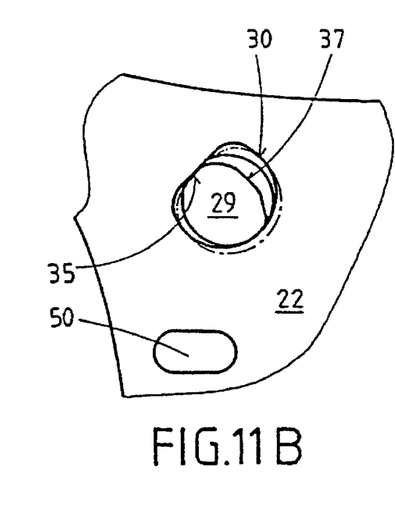
FIG. 11b shows the locking bolt illustrated in FIG. 11A in a broken-away side view onto the inner side of the adjusting armature.
Figure 12:
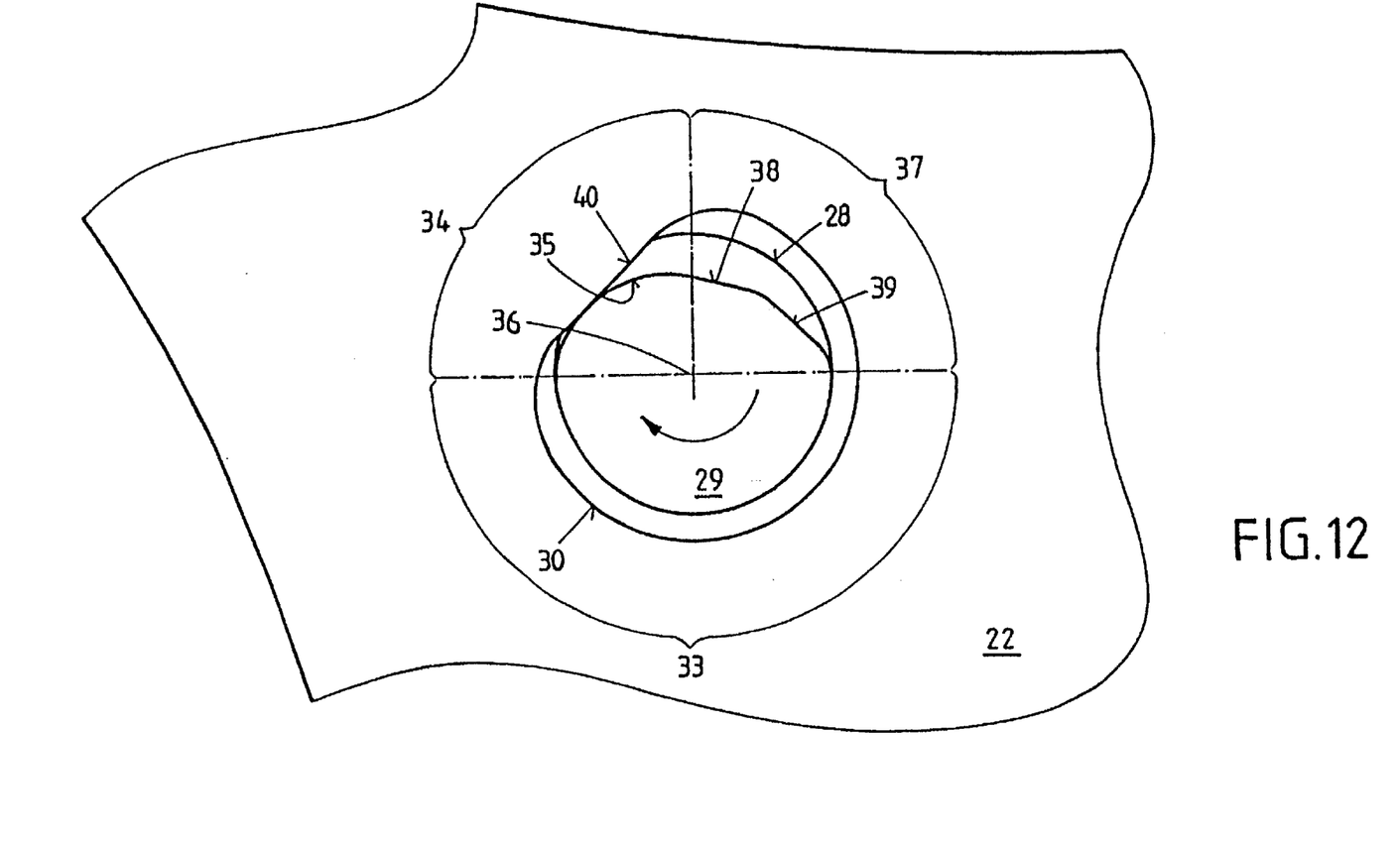
FIG. 12 shows the locking bolt of FIG. 10B in an enlarged representation relative to FIG. 10B, wherein the locking bolt is arranged in the locking bolt receptacle in a play-eliminating position.

As illustrated in FIGS. 7, 8B–11B and most clearly in FIG. 12, the periphery of the locking section 29 on the locking bolt 21 has a constant radius about a partial area 33 of approximately 180° which is adjoined by a circumferential area 34 of approximately 90° in which a support curve 35 extends which, starting with the constant radius, has a continuously decreasing radial spacing from the center 36 of the locking bolt 21 and has a transition into at least one planar area 37.

The support curve 35 is advantageously formed as a logarithmic spiral while the planar area 37 is comprised of two planar roof-shaped partial planes 38 and 39 abutting one another. The locking section 29 of the locking bolt 21 in the locking situation is surrounded by a locking bolt receptacle 30 which about a further circumferential area has a greater diameter than the diameter of the locking bolt 21. This wide circular circumferential area of the locking bolt receptacle 30 is interrupted by a support surface 40 which extends as slanted plane whose normal extends at an angle of 90° at a slant to the front side of the seat part 10 and in a downward direction.

In order to enable a play-free bracing of the armature component 14 relative to the seat part 10, a readjustment of the support curve as a result of the rotation of the locking section 29 of the locking bolt 21 relative to the support surface 40 on the locking plate 22 is required. For this reason, the bushing 26 in the illustrated embodiment has two diametrically oppositely extending thread-like (spiral) sliding gates 41, which can be seen most clearly in FIGS. 3, 10A and 11A. The sliding gate 41 is formed by thread-like slots in the cylinder mantle area of the bushing 26. Guide pins 43 functioning as a sliding block 42 engage this sliding gate 41 and project past it outwardly, as is clearly illustrated in FIG. 3 and FIG. 9A.

The bushing 26 is engaged by a trigger sleeve 44 which also has guide grooves 45 ascending also in the axial direction. The guide pins 43 projecting from the sleeve 26 engage the guide grooves 45. In order to ensure that, during a rotational movement of the trigger sleeve 44, it rests always against the rotary bracket 17 as a result of the action of the pressure spring 32, the guide grooves 45 also have an ascending course whose slant is however substantially greater than the slant of the slots of the bushing 26 forming the sliding gate 41. The trigger sleeve 44 has at its circumference a connecting finger 47 which can be the point of contact for a pulling member, for example, in the form of a Bowden cable.

Figure 7:
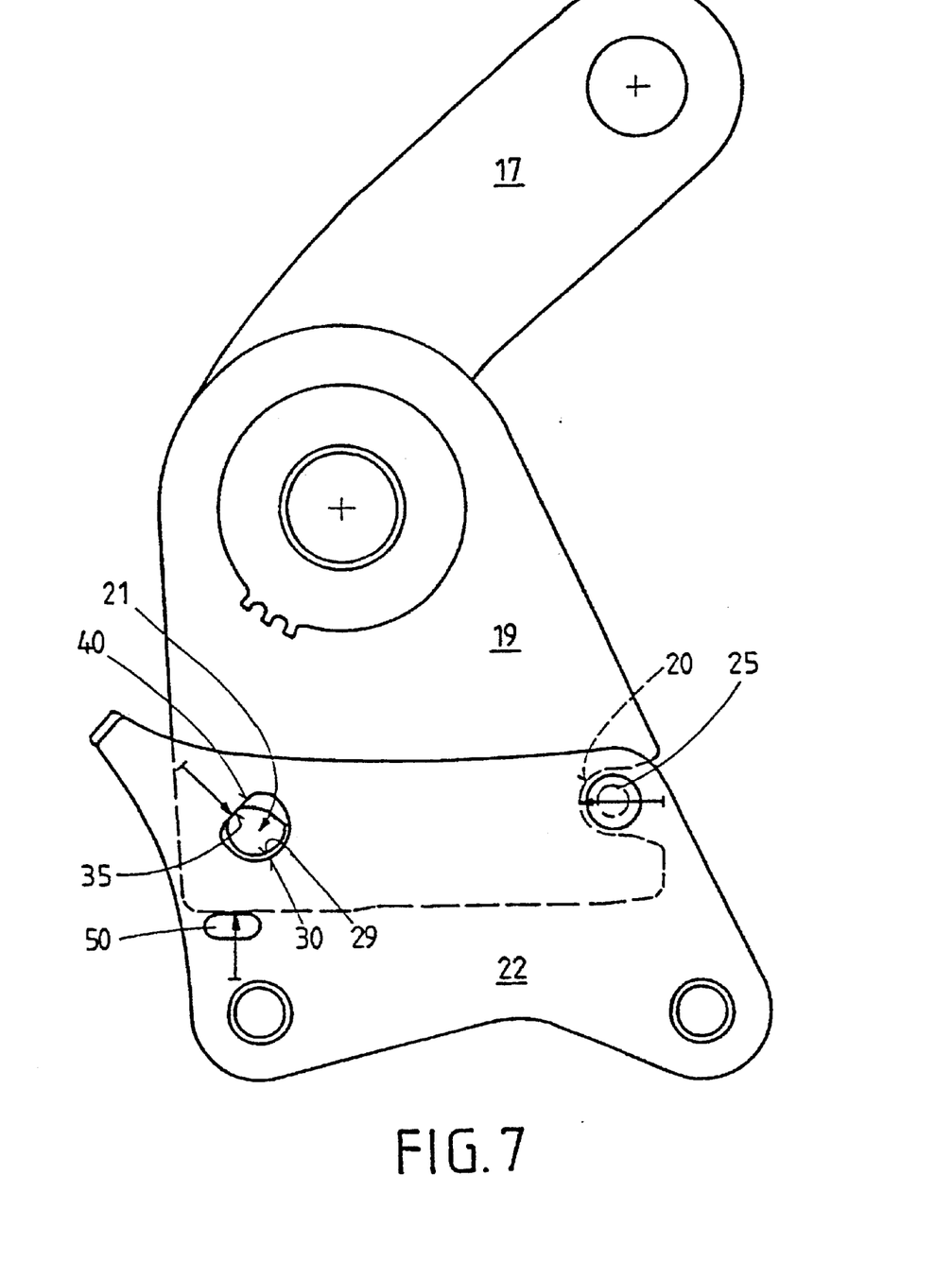
FIG. 7 shows the adjusting armature according to FIG. 4 in a side view onto its inner side.

In order to automatically push back the locking section 29 of the locking bolt 21 projecting from the bushing 26 and the armature part 19 upon return movement of the back rest 11 without actuating the trigger sleeve 44, the locking plate 22 has a guide rail 48 which projects into the pivot path of the locking bolt 21 and has at its side facing the armature part 19 a slanted surface 49 by which the locking bolt 21 in the last phase of the return movement is forced into the bushing 26 against the force of the pressure spring 32. When the armature component 14 is returned in the locked position, a stop 50 is provided below the locking bolt 21 on the locking plate 22 against which stop the underside of the rotary bracket 17 and the armature part 19 rest. This stop 50 as well as the stop bolt 25 in the locking situation receive counter forces of the locking force exerted by the locking section 29 of the locking bolt 21; this is illustrated in FIG. 7 by the arrows. This results in a safe play-free 3-point support in the locking situation.

Figure 8A:
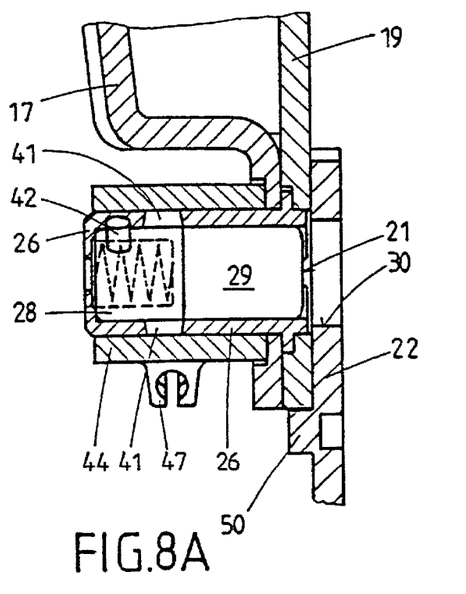
FIG. 8A shows in section the area of the adjusting armature receiving a locking bolt, the adjusting armature in the position illustrated in FIG. 1A wherein, however, the locking bolt is illustrated in its release position.
Figure 8B:
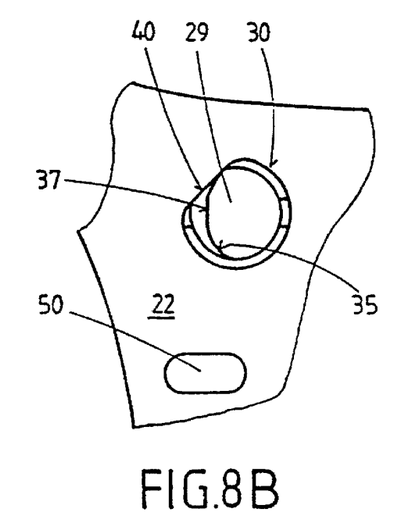
FIG. 8B shows the locking area of the adjusting armature illustrated in FIG. 8A in a broken-away view onto the inner side.

For explaining the locking function, FIGS. 8A and 8B will be used as a starting point. Here it is shown that the locking bolt 21 is retracted completely into the bushing 26 against the force of the pressure spring 32 loading it so that its end face does not project past the outer side of the armature part 19. The locking bolt 21 is transferred by the trigger sleeve 44 into this position. This unlocking or release position can be seen in FIGS. 8A and 8B.

Figure 9A:
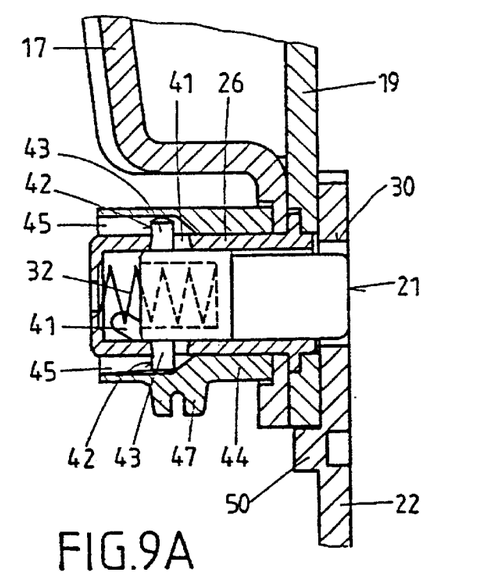
FIG. 9A shows the sectional view illustrated in FIG. 8A of the locking area in which the locking bolt is shown in a position in which it has dropped into the locking bolt receptacle.
Figure 9B:
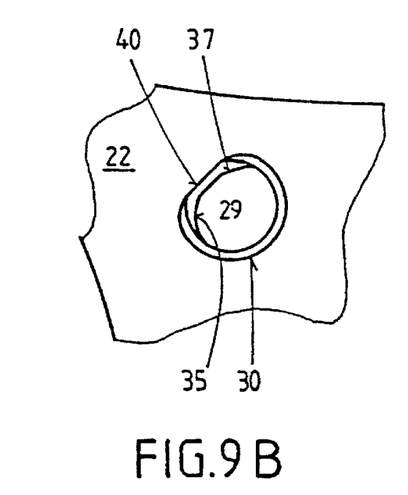
FIG. 9B shows the locking area illustrated in FIG. 9A in a broken-away view onto the inner side of the adjusting armature.

When the trigger sleeve 44 is now released, by means of the pressure spring 32 the locking bolt 21 is moved into the position illustrated in FIGS. 9A and 9B where it has dropped into the locking bolt receptacle 30 of the locking plate 22. In this connection, the locking bolt 21 has been rotated by means of its guide pins 43 with the sliding gate 41 into the position illustrated in FIG. 9B; however, in this position there is still play all-around between the locking section 29 of the locking bolt 21 and the locking bolt receptacle 30 as can be seen, in particular, in FIG. 9B. Since however the pressure spring 32 still exerts its pressure force and moves the locking bolt 21 farther axially, it rotates accordingly in a clockwise direction because of the sliding gate 41 and the guide pins 43 engaging therein so that finally the support curve 35 will rest against the support surface 40 of the locking bolt receptacle 30, as illustrated in FIG. 10B. In this position a tensioned locking action of the armature component 14 on the locking plate 22 connected to the seat frame results.

Figure 10A:
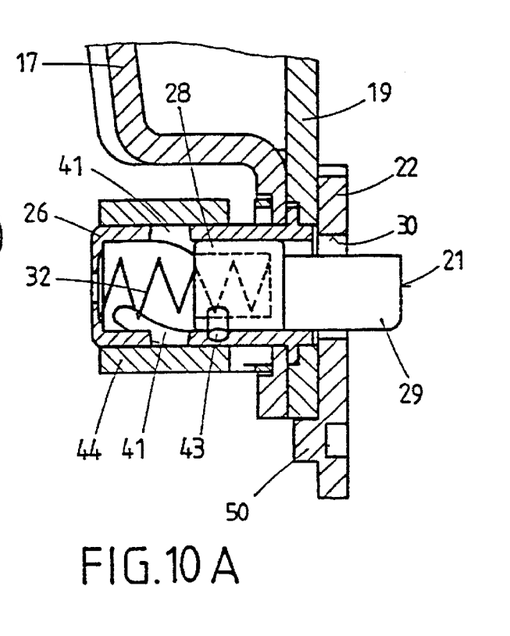
FIG. 10A shows the locking area of the adjusting armature illustrated in FIG. 8A in section, wherein the locking bolt has been positioned so far into the locking bolt receptacle that play in the system is eliminated.

The tensioned position (bracing position) shown in the preceding FIGS. 10A and 10B is also present in FIGS. 11A and 11B in which, however, as a result of a different tolerance position of the locking bolt receptacle 30 relative to the position shown in FIG. 10B, locking bolt 21 has been moved farther.

As mentioned above, the illustrated and described configuration of the present invention is to be viewed only as an exemplary embodiment.

While specific embodiments of the invention have been shown and described in detail to illustrate the inventive principles, it will be understood that the invention may be embodied otherwise without departing from such principles.

What is claimed is:

1. An adjusting armature in combination with a motor vehicle seat having a seat part and a back rest, wherein the back rest, which is adjustable about a first axis of rotation in an inclined position and lockable in the inclined position by an adjusting device, is adapted to fold forwardly and backwardly relative to the seat part of the motor vehicle seat about a second external axis of rotation, positioned at a distance from the first axis of rotation, and is adapted to be secured in a folded-back position; the adjusting armature comprising:

- a rotary bracket connected to the back rest so as to pivot with the back rest;
- a locking bolt receptacle stationarily arranged on the seat part and having a planar support surface;
- a locking bolt axially moveably arranged on the rotary bracket and spring-loaded in a locking direction for releasably engaging the locking bolt receptacle;
- a stop bolt stationarily arranged on the seat part;
- a stop receptacle provided on the rotary bracket adapted to interact with the stop bolt;
- wherein the locking bolt has a guide section and a locking section having a radially changing support curve;
- wherein the guide section of the locking bolt is adapted to undergo a rotational movement in addition to being axially guided;
- wherein the rotational movement causes the radially changing support curve of the locking section to be supported on the planar support surface of the locking bolt receptacle so as to eliminate play.

2. The adjusting armature according to claim 1, wherein the locking section has a first partial peripheral area extending about approximately 180° with a constant radius, a second partial peripheral area extending about 90° and adjoining the first partial peripheral area, wherein the support curve is provided on the second partial peripheral area, wherein the support curve, starting with the constant radius of the first partial peripheral area has a continuously decreasing radial spacing relative to a center of the locking bolt, and at least one planar area forming a transition between the first and second partial peripheral areas, wherein the locking bolt receptacle has a part-circular circumferential area adjoining the planar support surface.

3. The adjusting armature according to claim 2, wherein the rotary bracket has a bushing provided with a spirally extending sliding gate, wherein the guide section of the locking bolt is axially moveably arranged in the bushing and comprises at least one sliding block engaging the sliding gate of the bushing.

4. The adjusting armature according to claim 3, further comprising a trigger sleeve surrounding the bushing, wherein the trigger sleeve has at least one guide groove ascending in an axial direction of the trigger sleeve, wherein a slant of the at least one guide groove is greater than a slant of the sliding gate of the bushing, wherein the at least one sliding block penetrates the sliding gate and engages the at least one guide groove.

5. The adjusting armature according to claim 4, wherein the siding gate and the at least one guide groove are arranged on two diametrically opposite locations of the bushing and the trigger sleeve and the at least one sliding block is comprised of two guide pins arranged on the guide section of the locking bolt, wherein the guide pins penetrate the sliding gate and project into the at least one guide groove.

6. The adjusting armature according to claim 4, wherein the trigger sleeve has a connecting finger for attaching a pulling device for introducing a rotary movement into the trigger sleeve.

7. The adjusting armature according to claim 6, wherein the pulling device is a Bowden cable.

8. The adjusting armature according to claim 1, further comprising a guide rail provided with a slanted surface and connected to the seat part, wherein the guide rail projects into a return pivot path of the locking bolt when the back rest pivots backwardly.

9. The adjusting armature according to claim 8, comprising a bearing bracket fixedly connected to the seat part and a locking plate fixedly connected to the seat part, wherein the locking bolt receptacle and the guide rail are connected to the locking plate.

10. The adjusting armature according to claim 9, wherein the rotary bracket has an armature part comprising the first axis of rotation, wherein the locking plate has a stop arranged underneath the locking bolt receptacle, wherein the stop is an abutment for the rotary bracket and the armature part.

* * * * *